Figure 1:
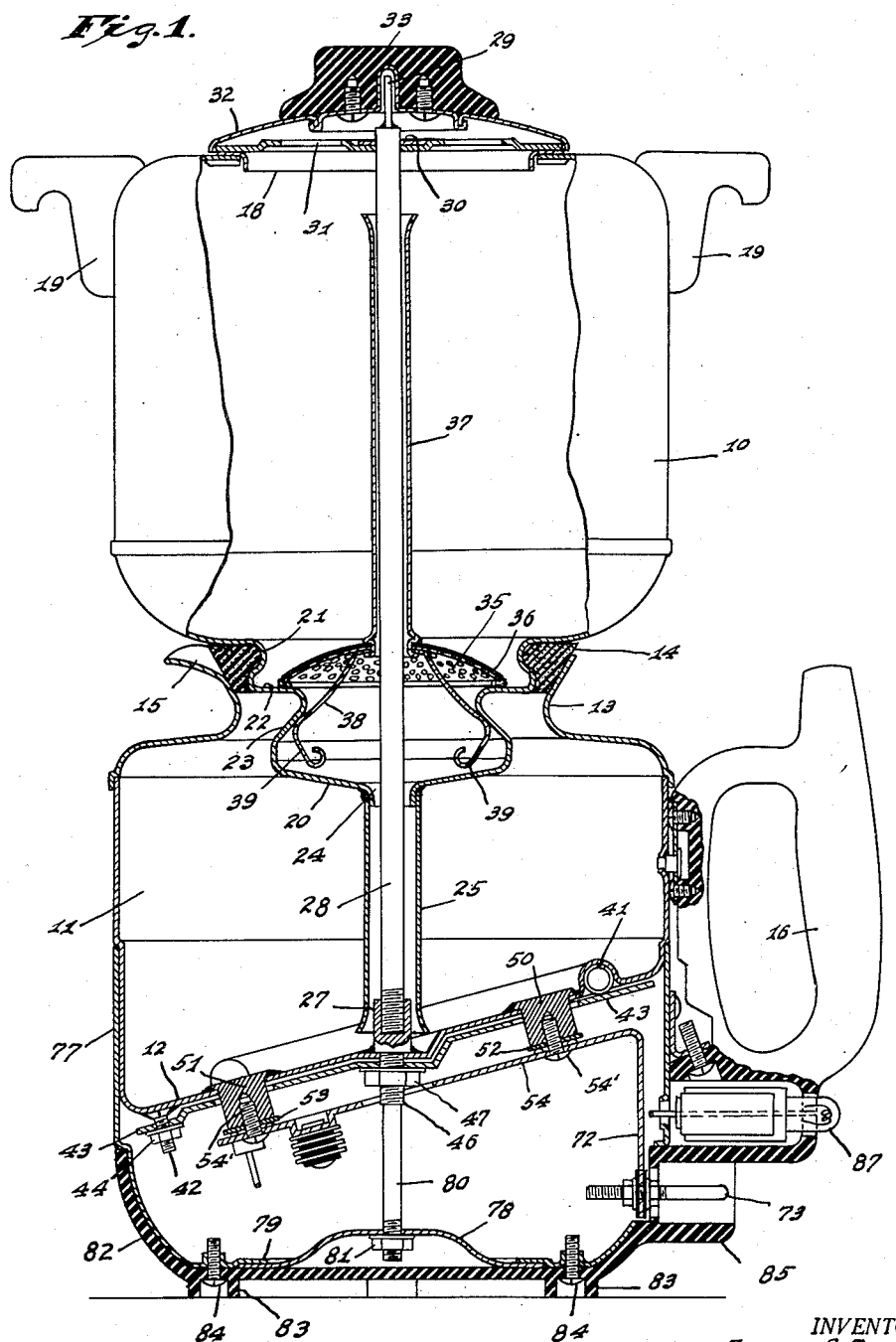

Oct. 5, 1954  E. A. FARR ET AL  2,690,709
ELECTRIC COFFEE MAKER
Filed Oct. 8, 1948  2 Sheets-Sheet 1

INVENTORS
EDWARD A. FARR and
JOHN P. THEISEN,
BY
ATTORNEYS.

Oct. 5, 1954  E. A. FARR ET AL  2,690,709
ELECTRIC COFFEE MAKER
Filed Oct. 8, 1948  2 Sheets-Sheet 2
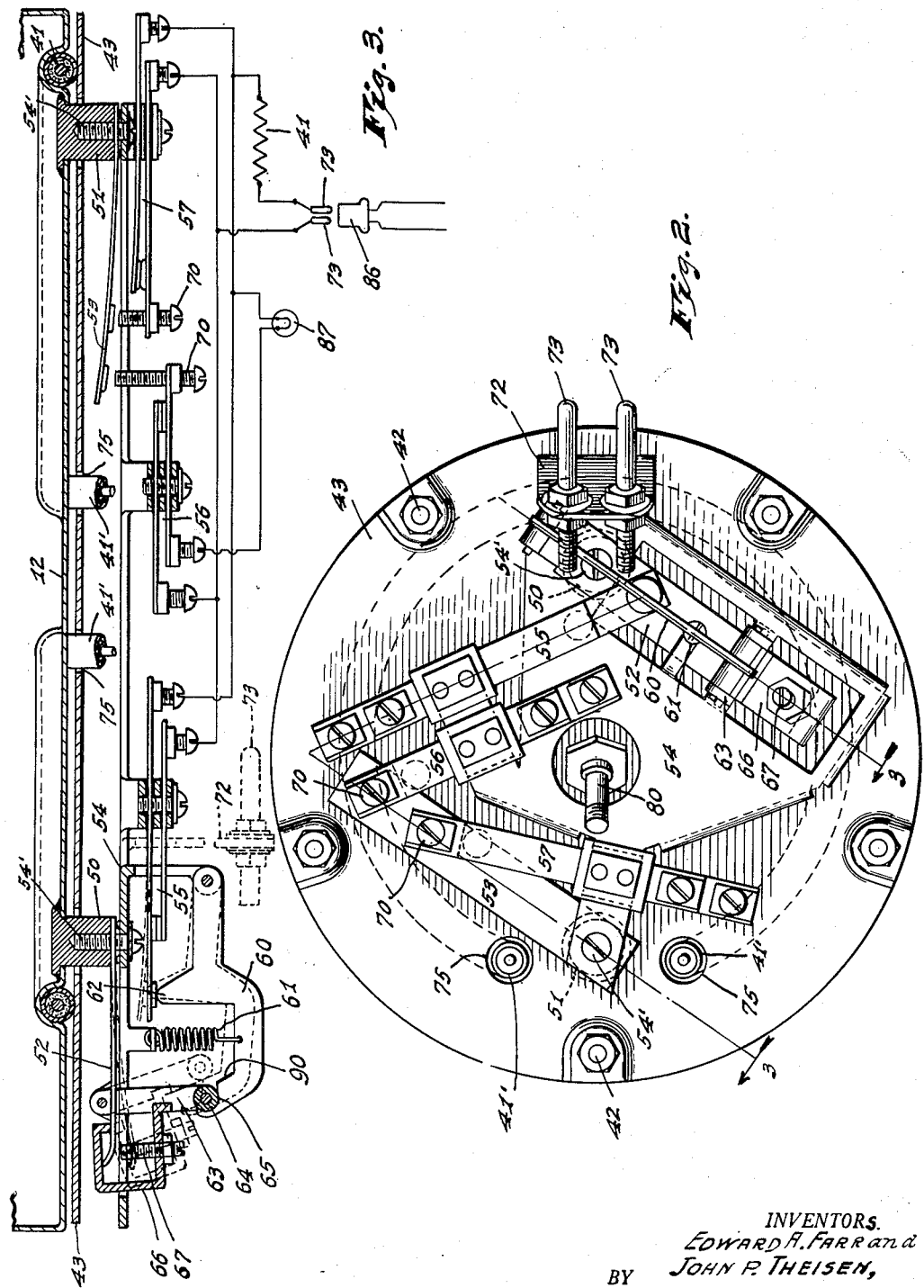
INVENTORS.
EDWARD A. Farr and
BY  JOHN P. THEISEN,
ATTORNEYS.

Patented Oct. 5, 1954

2,690,709

UNITED STATES PATENT OFFICE 2,690,709

ELECTRIC COFFEE MAKER

Edward A. Farr and John P. Theisen, Columbus, Ind., assignors to Arvin Industries, Inc., a corporation of Indiana Application October 8, 1948, Serial No. 53,528

2 Claims. (Cl. 99—281)

This invention relates to coffee makers of the vacuum type and more particularly to an automatic means for controlling the operation of such a coffee maker. Vacuum coffee makers embody a brewing vessel and a storage vessel, the former usually superposed on the latter, interconnected for transfer of liquid from one to the other. The storage vessel is sealed except for its communication with the brewing vessel, and the connection through which liquid flows from the brewing vessel to the storage vessel is provided with a filter. In use, appropriate quantities of ground coffee and of water are placed respectively in the brewing vessel and in the storage vessel, and the storage vessel is heated to boil the water therein. As the water boils, the resulting increase in pressure forces the water or a large part of it into the brewing vessel where it comes into contact with the ground coffee therein. Upon subsequent interruption of the heating of the storage vessel, its temperature drops and the steam therein condenses to form a vacuum which draws the brewed coffee back into the storage vessel through the filter.

It has heretofore been proposed to provide means for automatically interrupting heating of the storage vessel when an adequate quantity of water therein has been displaced into the brewing vessel as a result of steam pressure. It has also been proposed to employ such automatic means to maintain the brewed coffee in the storage vessel at a predetermined minimum temperature. However, prior automatic control means of which we are aware have required a manual resetting between successive brewing operations and have involved relatively complicated structures which can be manufactured in quantity only with difficulty.

It is an object of this invention to produce for a vacuum-type coffee maker an automatic control which will automatically terminate the heating of the storage vessel when an adequate quantity of liquid has been transferred therefrom and which will not require any manual resetting before a subsequent brewing operation. Another object of the invention is to provide control means which can be simply and economically manufactured for maintaining the brewed coffee at a predetermined minimum temperature. Still another object of the invention is to provide an automatic coffee maker with a signalling device which will indicate the completion of a brewing operation and which will therefore enable the coffee maker to be made of metal or other opaque material.

In carrying out the invention, we mount the brewing vessel on the storage vessel and provide a central tube through which water may be transferred upwardly from the storage vessel into the brewing vessel. We also provide a filter through which the brewed coffee must pass in returning to the storage vessel. Responsive to the temperature of the storage vessel are a pair of temperature-responsive elements controlling independent electric switches which, in turn, control the supply of electric current to a heating element associated with the storage vessel. One of these switches controls the temperature of the brewed coffee by closing under the control of its associated temperature-responsive element whenever the temperature of the brewed coffee reaches a predetermined minimum. The other switch is controlled by an operating member biased toward a switch-opening condition and normally restrained from switch-closing movement by a trigger. The second temperature-responsive element is operatively associated with such trigger to move it from a normal to a released position upon a rise in temperature and to move it toward its normal position upon a drop in temperature. The trigger and switch operating member have cooperating provisions which cause the operating member to be moved to its switch-closing position as the temperature-responsive element tends to move the trigger toward its normal position. If desired, the coffee maker may include an electric signal lamp conveniently controlled by a third switch operated by the first temperature-responsive element. The switch-operating mechanisms are so arranged as to de-energize the heating element when the proper amount of water has been transferred to the brewing vessel, to light the signal lamp when the brewed coffee has returned to the lower vessel, and to energize and de-energize the heating element as required to keep the brewed coffee at a predetermined minimum temperature.

The accompanying drawings illustrate our invention:

Fig. 1 is a side elevation, in partial section, of an assembled coffee maker; Fig. 2 is a bottom plan view of the automatic control mechanism; and Fig. 3 is a somewhat diagrammatic developed section roughly on the broken line 3—3 of Fig. 2.

The coffee maker shown in the drawing comprises an upper brewing vessel 10 and a lower storage vessel 11 from which the upper vessel is supported. The lower vessel has an inclined bottom wall 12, and, at its top, an upwardly flaring neck 13 adapted to receive a gasket 14 on the upper vessel. The neck 13 may be provided at one point in its circumference with a pouring lip 15. On the side opposite the lip 15, the lower vessel is provided with a handle 16.

The upper vessel 10 is formed with an opening 18 at its top and is conveniently provided with diametrically opposite handles 19. At its bottom, the upper vessel 10 is provided with an extension 20 of reduced diameter. Adjacent the bottom of the upper vessel 10, the extension 20 is formed to provide an annular groove adapted to receive a bead 21 on the inner surface of the gasket 14, whereby the gasket is retained in association with the upper vessel. Below the bead-receiving groove, the extension is formed to provide a generally plane annular surface 22, the purpose of which will become apparent hereinafter. From the inner edge of the surface 22, the extension continues downwardly, first flaring outwardly as indicated at 23 and then inwardly to join the upper end of a tube 25. The tube 25 is of such a length that when the coffee maker is assembled, as shown in Fig. 1, the lower end of such tube will be located adjacent the sloping bottom 12 of the lower vessel 11.

For the purpose of positively holding the upper vessel in place on the lower vessel, there is secured at the center of the bottom 12 an upwardly projecting, internally threaded boss 27 adapted to receive the screw-threaded lower end of a rod 28 which projects upwardly through the tube 25 and the interior of the upper vessel to a point beyond the top thereof. At its upper end, the rod 28 is provided with a transversely extending head 29 and below such head with a rigid collar 30 adapted to engage a spider 31 which is of larger diameter than the opening 18 and which rests on the upper surface of the vessel 10. For the sake of appearance, the spider 31 may be enclosed beneath a loosely fitting cover 32 having a central knob 33. If desired, the central knob 33 on the cover 32 may be recessed to receive the transversely extending head 29 on the rod 28 so that, by rotation of the knob 32 and cover 32, the rod 28 can be rotated to engage it with or disengage it from the boss 27. As the rod 28 is rotated to tighten it in the boss 27, the collar 30 engages the spider 31 to force such spider downwardly; and, as the spider overlaps the edge of the opening 18, the upper vessel 10 is in turn forced downwardly to seat the gasket 14 tightly in the neck 13 of the lower vesel.

The filter element with which vacuum coffee makers are commonly provided takes the form of an upwardly dished perforated metal disk 35 covered with a filter cloth 36 the edge of which is turned under the periphery of the disk 35. The disk 35 is mounted at the lower end of a filter-carrier 37 in the form of a tube loosely surrounding the rod 28. To hold the filter in position, the lower end of the carrier 37 has secured to it a leaf spring 38 adapted to engage the inner surface of the downwardly and outwardly flaring portion 23 of the extension 20. The extreme ends of the spring 38 extend downwardly and inwardly, as indicated at 39, so that, when the filter and filter carrier are inserted by downward movement, the spring-ends 39 will engage the extension 20 adjacent the inner edge of the annular surface 22 with the result that upon continued application of downward effort the spring may be collapsed and permitted to pass through the reduced-diameter portion of the extension 20. As the spring expands after passing such reduced-diameter portion, it resiliently engages the downwardly and outwardly flaring annular wall 23 the reaction of which on the spring urges the filter carrier downwardly to hold the filter resiliently in contact with the surface 22.

The heating element employed to boil water in the lower vessel 11 is desirably a sheathed electrical resistance heating element 41 bent into an arcuate form and received in a downwardly opening arcuate groove provided in the bottom 12 of the lower vessel 11. To secure the heating element in place, while permitting its ready removal or replacement, we secure to the bottom 12 an annular series of angularly spaced studs or screws 42 which project downwardly from the bottom 12 through openings in a retainer plate 43. Nuts 44 on the studs 42 may be tightened to force the retainer plate 43 upwardly into contact with the heating element 41, thus positively seating such heating element in the groove in the vessel-bottom 12. In addition to the studs or screws 42, which engage the retainer plate 43 at its periphery, the retainer plate may also be supported at its center. To this end, the boss 27 is desirably the head of a stud having a screw-threaded shank 46 which projects downwardly through a central opening in the vessel-bottom 12 and receives a nut 47 which may be tightened to urge the central portion of the retainer plate 43 upwardly.

The automatic timing mechanism which is incorporated in the device is supported from upper and lower bosses 50 and 51 secured to and projecting downwardly from the vessel-bottom 12 through holes in the retainer plate 43. The two bosses 50 and 51 are desirably located diametrically opposite each other with the stud 50 secured to the bottom 12 above the center of the bottom and the stud 51 secured to the bottom below such center. In contact respectively with the lower ends of the studs 50 and 51 are two bi-metallic strips 52 and 53 which, as will be clear from Fig. 2, extend generally chordally of the retainer plate 43 and generally parallel to each other. To secure the bi-metal strips 52 and 53 in position, they are clamped between the lower ends of the studs and a mounting plate 54 by screws 54' which extend through the mounting plate and into the studs. The mounting plate 54 is cut away to avoid interference with generally vertical movement of the free ends of the bi-metal strips 52 and 53 and is also formed to provide a mounting for three switches 55, 56, and 57 each embodying a pair of flexible leaves carrying engageable contacts. The switch 55, which we call for convenience the main switch, is arranged to be operated under the control of the bi-metal strip 52 while the other switches 56 and 57 are controlled in common by the other bi-metal strip 53. The bi-metal strips 52 and 53 are both arranged so that their free ends will move downwardly under the influence of rising temperatures.

For the purpose of operating the switch 55 under the control of the bi-metal strip 52, the mounting plate 54 is formed to provide for the pivotal support of one end of a switch-operating lever 60. Associated with the lever 60 is a tension spring 61 which urges the lever upwardly so that an extension 62 intermediate its length will engage the upper leaf of the switch 55 to open such switch. Normally, the lever 60 is held depressed against the effort exerted upon it by the spring 61 through the medium of a trigger 63 which is pivotally mounted at its upper end on the mounting plate 54 and which carries at its lower end a roller 64 adapted to be received in a notch 65 in the outer end of the lever 60. The trigger 63 has a generally U-shaped portion 66 into which the free end of the bi-metal strip 52 extends. A screw 67 extending through the lower side of the U-shaped portion 66 in position to be engaged by the lower surface of the bi-metal strip 52 provides an adjustable abutment engageable by such strip as its free end moves downwardly.

In the two switches 56 and 57, the lower leaves project outwardly beyond the respective upper leaves and are provided with adjusting screws 70 positioned to be engaged by the bi-metal strip 53 upon downward movement of the free end thereof.

In addition to providing a support for the bi-metal strips 52 and 53 and for the switches 55, 56, and 57, the mounting plate 54 is provided at one side with a downwardly bent ear 72 to which electrical terminal posts 73 are secured. It will of course be understood that the posts 73 are insulated from the mounting plate and from each other. The end portions of the heating element 41 are bent downwardly, as indicated at 41', to project through holes 75 in the retainer plate 43. The terminals of the heating element and the switches 55, 56, and 57 are electrically interconnected in a manner hereinafter described by appropriate conductors which are not indicated in the drawing otherwise than diagrammatically, in Fig. 3.

The parts so far described as supported below the bottom of the lower vessel 11 are enclosed within a cup-like housing 77 conveniently formed of sheet metal. To facilitate connection of the housing 77 with the lower vessel 11, the lower portion of the latter, from a point slightly above the highest point of the bottom 12, is reduced in diameter slightly to provide an outwardly and downwardly presented shoulder adapted to be engaged by the rim of the housing 77.

To secure the housing 77 in position on the lower end of the vessel 11, we may employ a retainer plate 78 of somewhat larger diameter than a central opening 79 in the bottom of the housing 77 and provided at its center with an opening adapted to receive a downward extension 80 of the post 46. The lower end of the post-extension 80 is threaded for the reception of a nut 81 which, when tightened, draws the retainer 78 upwardly and clamps the housing 77 against the annular shoulder on the vessel 11.

For the sake of appearance, the lower portion of the housing 77 may be received within a base 82, conveniently of some suitable molded synthetic resin. The base is provided at angularly spaced intervals with feet 83 each of which has in its bottom a recess receiving the head of a retaining screw 84 which passes upwardly through the base into a screw-threaded opening in the housing 77. The housing and base are provided at one side with aligned openings through which the terminal posts 73 extend, and the base is desirably formed, as indicated at 85, to provide a protective enclosure for the outer ends of the terminal posts. The enclosure 85 is large enough interiorly to receive a plug 86 (Fig. 3) on one end of a flexible, two-conductor cord through which the terminal posts 73 may be connected to an appropriate source of electric current.

The preferred embodiment of the invention illustrated in the drawing comprises an electric lamp 87 mounted in a socket 88 supported in any convenient manner by the base 82 or in the lower end of the handle 16.

Referring to Fig. 3, it will be apparent that the switches 55 and 57 are connected in parallel with each other and in series with the heating element 41 across the terminals 73 and that the lamp 87 is connected in series with the switch 56 in a shunt circuit around the switches 55 and 57. Accordingly, when electric current is supplied to the terminals 73, the closing of either switch 55 or 57 will energize the heating element 41, while the closing of the switch 56 will cause the lamp 87 to light only if both switches 55 and 57 are open. The resistance of the lamp 87 is great enough to prevent the flow of more than an insignificant current when only the switch 86 is closed. The adjusting screws 70 are set to cause opening of the switch 56 at a temperature of about 195° to 205° F. and opening of the switch 57 at a temperature of about 160° to 170° F.

To make coffee in the device described, the rod 28 is rotated to unscrew it from the boss 27, either by rotation of the knob 33 and cover 32 or, after removal of the cover, by direct manipulation of the head 29. When the rod 28 has been completely unscrewed from the boss 27, the upper vessel 10, together with the rod 28, spider 31, filter carrier 37, and the filter, are removed from the lower vessel. The desired quantity of water is then placed in the lower vessel 11, the upper vessel 10 is replaced, the filter carrier is manipulated if necessary to seat the filter against the sealing surface 22, and the desired charge of ground coffee is placed in the upper vessel. The spider 31, rod 28, and cover 32 are then applied and the cover is rotated to rotate the rod 28 and screw it into the boss 27. This operation draws the upper vessel 10 downwardly, causing the gasket 14 to seat tightly against the flaring neck of the lower vessel. The connection of the terminals 73 with a source of electric current is then established, as by inserting the plug 86 into the recess 85.

With the parts in the condition illustrated in Fig. 3, the switches 57 and 55 are closed, thus causing current to be supplied to the heating element 41. The switch 56 is likewise closed; but as the lamp 87 is short-circuited by the closed switches 55 and 57, the lamp is not lighted. As the temperature of the water in the lower vessel increases, the free ends of the bi-metallic strips 52 and 53 swing downwardly. When the water temperature reaches that for which the switch 57 is set, such switch opens; but as the switch 55 remains closed, the lamp remains extinguished, the heating element 41 continues energized, and the temperature of the water continues to increase. As the water temperature approaches the boiling point, the switch 56 is opened. When the water begins to boil, increased pressure within the lower vessel 11 forces the water upwardly through the tube 25 into the upper vessel 10. Eventually, sufficient water is displaced from the lower vessel to uncover the boss 50 and the adjacent portions of the bottom 12 of the lower vessel. When this occurs, the temperature of the boss 50 rises rather rapidly since there is no adjacent water present to absorb the heat emanating from the heating element 41. The adjusting screw 67 on the trigger 63 is so set that when the boss 50 is uncovered the downwardly moving free end of the bi-metallic strip 52 will promptly engage such screw to swing the trigger 63 in a counterclockwise direction (Fig. 3) and move the roller 64 out of the notch 65, thus permitting the spring 61 to swing the switch-operating member 60 upwardly and allow its abutment 62 to open the switch 55. The positions of the switch-operating member and trigger in this condition are illustrated in dotted lines in Fig. 3. As the switches 56 and 57 were previously opened, opening of the switch 55 will completely de-energize the heating element 41, and the lower vessel 11 begins to cool. As it cools below the boiling point of the water, the steam within the lower vessel 11 condenses to create a partial vacuum which draws the brewed coffee in the upper vessel downwardly through the filter 36 into the lower vessel. Since the brewed coffee returning to the lower vessel is at a temperature below the boiling point of water, because of the heat radiated from it while it was in the upper vessel, and since the temperature of the entire device falls after the heating element is de-energized, the return of the brewed coffee is accompanied by a drop in the temperature of the lower vessel, thus causing the bi-metallic strips 52 and 53 to move upwardly. Upward movement of the strip 52 is initially without any effect, but upward movement of the strip 53 rather promptly causes closing of the switch 56 and lighting of the lamp 87. This lighting of the lamp serves as a signal that the coffee-brewing operation has been completed. As the temperature of the brewed coffee in the lower vessel continues to drop, the resulting upward movement of the bi-metallic strip 53 eventually causes closing of the switch 57, re-energization of the heating element 41 and extinguishing of the lamp 87. Thereafter, the bi-metal strip 53 and the switch 57 cooperate to maintain the brewed coffee at or near a predetermined minimum temperature, the exact value of which is determined by the setting of the screw 70 in the lower leaf of the switch 57. Although the switch 56 remains closed, intermittent operation of the switch 57 causes intermittent lighting of the lamp 87.

So long as the terminal posts 73 remain connected to the source of current, the bi-metal strip 53 operates, as just described, to maintain the brewed coffee at a predetermined minimum temperature, thus preventing the bi-metal strip 52 from returning to its initial position shown in full lines in Fig. 3. However, when the terminal posts 73 are disconnected from the source of current to cause permanent de-energization of the heating element 41, the resultant upward movement of the bi-metal strip 52 causes its free end to engage the upper stretch of the U-shaped portion 66 of the trigger 63 to urge such trigger in a clockwise direction and force the roller 64 against a cam surface 66 provided on the switch-operating member 60 below the notch 65. The cam surface 66 is so inclined that the pressure of the roller 64 against it urges the free end of the switch-operating member 60 downwardly. When upward pressure of the bi-metallic strip 52 on the trigger 63 has become sufficient to overcome the influence of the spring 61, the roller 64 forces the free end of the member 60 downwardly and again enters the notch 65 to cause closing of the switch 55 and the conditioning of the coffee maker for another brewing operation. Closing of the switch 55 as a result of upward movement of the free end of the strip 52 occurs at a temperature above room temperature, but below that at which the brewed coffee is maintained by the switch 57 under control of the bi-metallic strip 53. Conveniently the switch 55 closes at a temperature in the neighborhood of 135° F.

We claim as our invention:

1. In an automatic vacuum-type coffee maker, a storage vessel, a brewing vessel, said storage vessel having a bottom including a peripheral portion located substantially in an inclined plane, a resistance heating element associated with both elevated and depressed sections of said peripheral bottom-portion, a conduit interconnecting said vessels and having a lower end communicating with the storage vessel at a point below the highest portion of said bottom, a heating-element circuit including a switch in series with said heating element for controlling the supply of current to said heating element, a temperature-responsive element responsive to the temperature at a point of said peripheral portion disposed above the lower end of said conduit, mechanism controlled by said temperature-responsive element for closing said switch at a predetermined relatively low temperature, for maintaining the switch closed throughout a subsequent temperature-rise, and for opening the switch at a predetermined relatively high temperature, a second switch in said circuit for controlling said heating element, and a second temperature-responsive element responsive to the temperature of a portion of said inclined bottom lying below the lower end of said conduit for operating said second switch.

2. In an automatic vacuum-type coffee maker, storage and brewing vessels, a conduit interconnecting said vessels and extending downwardly into said storage vessel, said storage vessel having a bottom including a first portion located above and a second portion below the lower end of said conduit, an electrical resistance heating element for heating said storage vessel, first and second switches connected in parallel with each other and in series with said heating element, a first temperature-responsive element mounted in intimate heat-conducting relation with said first bottom-portion for opening said first switch at a first predetermined temperature and for closing it at a second and materially lower predetermined temperature, and a second temperature-responsive element mounted in intimate heat-conducting relation with said second bottom-portion for opening said second switch above and closing it below a third predetermined temperature intermediate between said first and second predetermined temperatures.

References Cited in the file of this patent

UNITED STATES PATENTS

| Number | Name | Date |
| --- | --- | --- |
| 1,688,286 | Reichold | Oct. 16, 1928 |
| 1,743,073 | Simmons | Jan. 7, 1930 |
| 1,749,536 | Hogan | Mar. 4, 1930 |
| 2,076,096 | Samuels et al. | Apr. 6, 1937 |
| 2,175,727 | Graham | Oct. 10, 1939 |
| 2,212,100 | Keaton | Aug. 20, 1940 |
| 2,262,286 | Ireland | Nov. 11, 1941 |
| 2,268,633 | Aske | Jan. 6, 1942 |
| 2,269,111 | Jepson et al. | Jan. 6, 1942 |
| 2,287,580 | Wagner | June 23, 1942 |
| 2,312,555 | Jepson | Mar. 2, 1943 |
| 2,365,615 | Woodman | Dec. 19, 1944 |
| 2,386,278 | Strothers | Oct. 9, 1945 |
| 2,388,335 | McCullough | Nov. 6, 1945 |
| 2,504,728 | Purpura | Apr. 18, 1950 |
| 2,577,985 | Willman | Dec. 11, 1951 |